Aug. 30, 1932.   J. P. WILEY   1,874,839
AEROPLANE
Filed Jan. 10, 1931    3 Sheets-Sheet 2
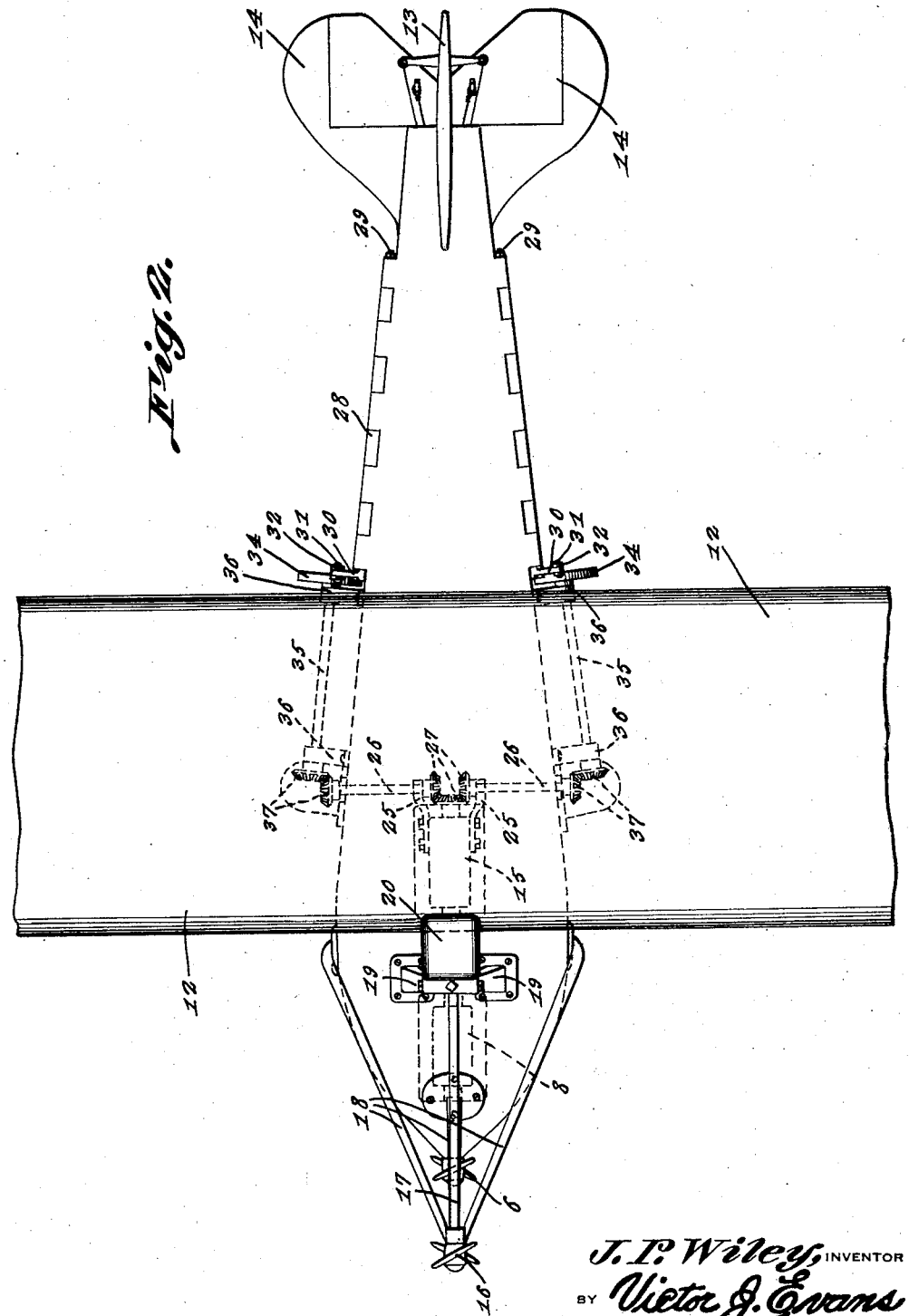

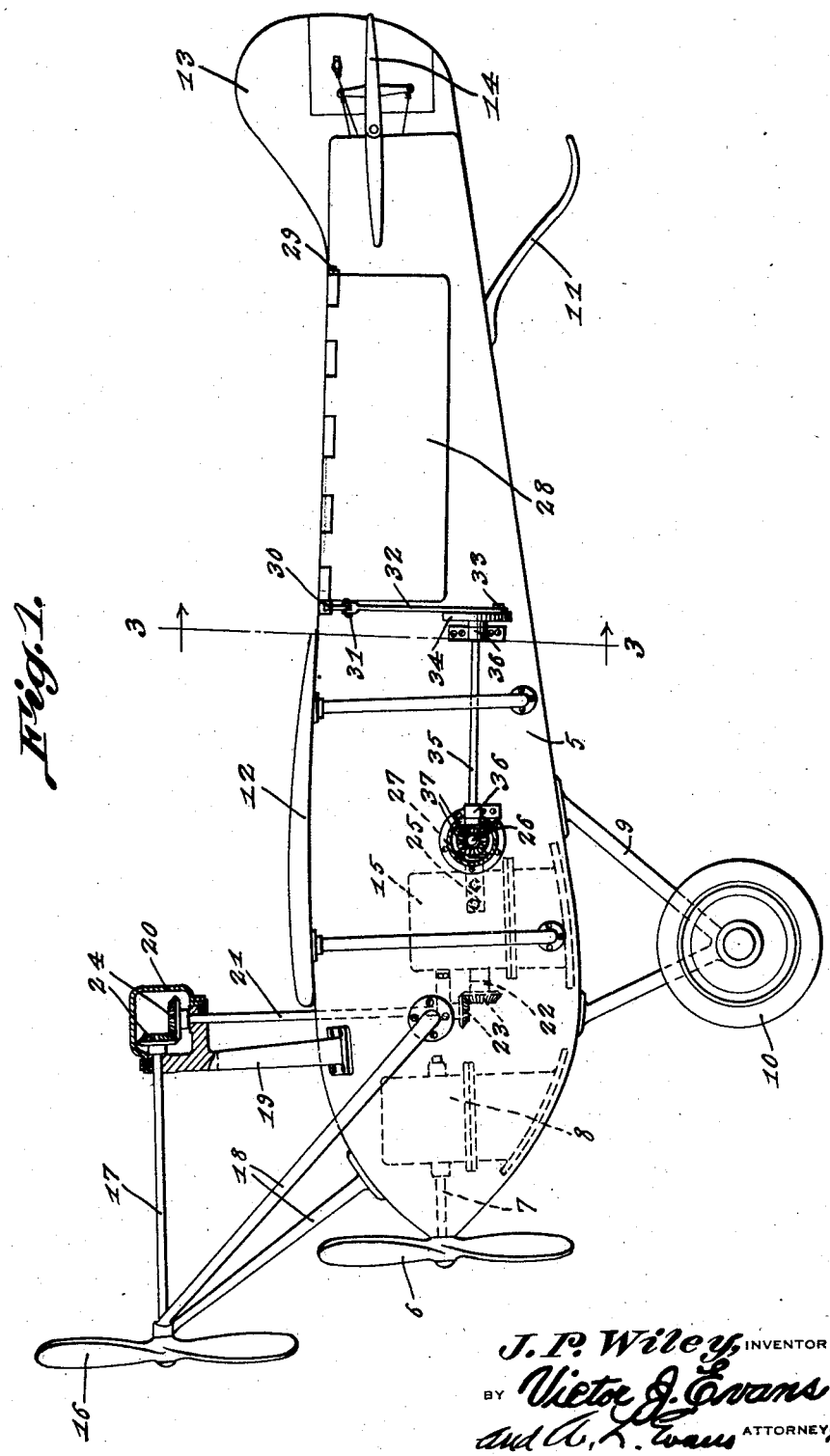

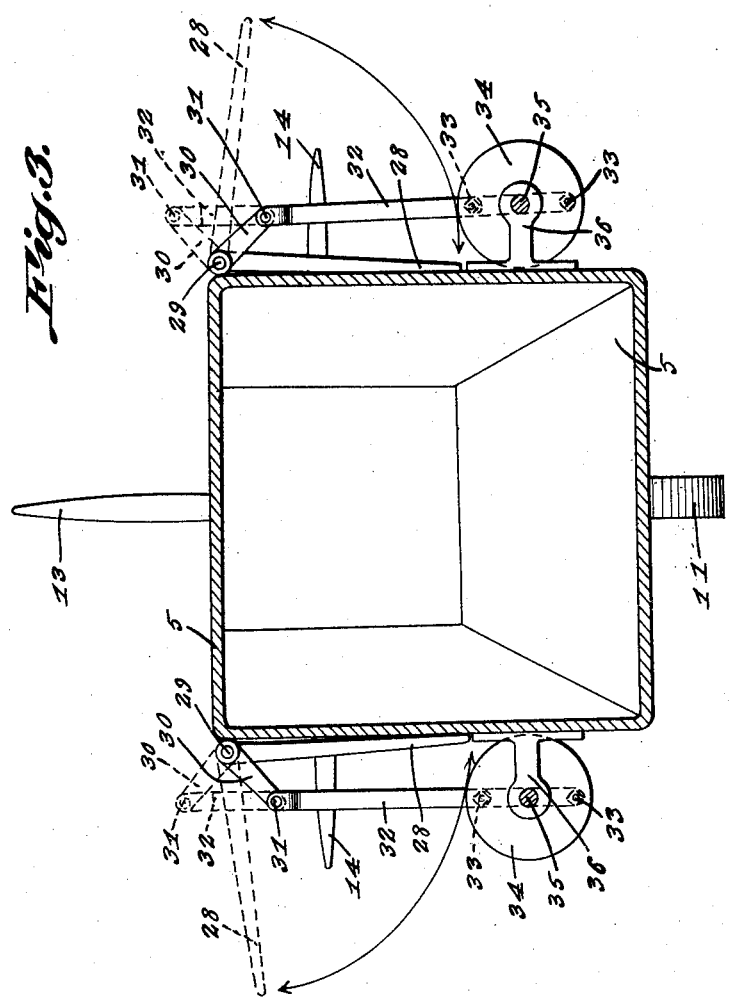

Patented Aug. 30, 1932

1,874,839

UNITED STATES PATENT OFFICE

JAMES P. WILEY, OF RAGLAND, ALABAMA

AEROPLANE

Application filed January 10, 1931. Serial No. 507,931.

The invention relates to an areoplane construction, and has for its primary object to provide an aircraft, wherein the same, in addition to its regular motor and propeller driven thereby, is augmented by a supplemental motor and propeller, the supplemental motor being also operative to actuate side wings, these, together with the supplemental propeller, operating as a safety mechanism in event that during flight, the main motor is stalled or becomes out of order, the aircraft can be brought to a safe landing by the use of the auxiliary or supplemental motor and propeller and the co-acting parts thereof.

Another object of the invention is the provision of an aircraft of this character, wherein a quick take-off can be had within a short ground run or a minimum distance of travel for the ascent of said craft and also a quick and safe landing in the descent of the craft may be effected.

A further object of the invention is the provision of an aircraft of this character, wherein the flight of the same is assured and also the take-off, as well as the landing had with a maximum degree of safety and with dispatch.

A still further object of the invention is the provision of an aircraft of this character which is comparatively simple in its construction, thoroughly reliable and efficient in its purpose, and inexpensive to manufacture.

With the above and other objects in view, the invention consists in the features of construction, combination and arrangement of parts, as will be hereinafter more fully described in detail, illustrated in the accompanying drawings which disclose the preferred embodiment of the invention, and pointed out in the claim hereunto appended.

In the accompanying drawings:—

Figure 1 is a side elevation of an aircraft constructed in accordance with the invention, parts thereof being partly broken away or in section.

Figure 2 is a fragmentary top plan view of the craft.

Figure 3 is a sectional view on the line 3—3 of Figure 1, looking in the direction of the arrows, the side wings being shown by full lines in closed relation to the fuselage, and by dotted lines in extended position relative thereto, while arrows indicate the path of movement of said wing.

Similar reference characters indicate corresponding parts throughout the several views in the drawings.

Referring to the drawings in detail, the aircraft comprises a fuselage 5 which may be of any standard construction and shape having at its nose or fore end the main propeller 6. The driving shaft 7 thereof is the main drive shaft of a motor 8 mounted within the fuselage 5 and this motor is of any conventional type for aircraft use. The fuselage 5 is carried upon a landing gear 9 having the landing ground wheels 10 and coactive with this gear is the tail skid 11 suitably connected with the rear end portion of the fuselage.

Carried on the fuselage 5 is the main plane or wing assembly 12, in this instance being of the monoplane type. At the aft end of the craft is the tail rudder 13 and tail wing assembly 14, which control thereof is effective in any conventional manner.

Within the fuselage is a supplemental motor 15, while mounted elevated with relation to the fuselage 5 and carried thereby is a supplemental propeller 16, its shaft 17 being journaled in supports 18 and 19 respectively, these being fixed to and extended from the fuselage. The support 19 has thereon a gear housing 20 in which is journaled an intermediate shaft 21 between said shaft 17 and the drive shaft 22 of the motor 15. The drive shaft 22 is connected with the intermediate shaft 21 through the medium of meshing gears 23 and also this intermediate shaft 21 is connected with the propeller shaft 17 through the medium of meshing gears 24, these being confined within the housing 20, as will be apparent from Figure 1 of the drawings. It will be obvious that the motor 15 will impart power and cause the driving of the supplemental propeller 16 when said motor is operated.

On the block of the motor 15 are mounted bearings 25 in which are journaled laterally directed counter shafts 26, these being extended exteriorly of the fuselage 5 and are connected with the drive shaft 22 of the motor through the medium of gearing 27 and operate for a purpose presently described.

Swingingly mounted on the fuselage 5 at opposite sides thereof and between the plane construction 12 and the tail plane assembly 14 are vertical swinging wings 28, each being of substantially rectangular shape and pivoted at 29 for swinging movement. On the forward end of each pivot 29 is a crank 30, the pivot being made fast to the wing 28 and this arm is pivoted at 31 to a throw rod 32, the same pivoted at 33 eccentrically to a wheel or disk 34 on a driven shaft 35 journaled exteriorly in suitable bearings 36 exteriorly on the fuselage 5  These shafts 35, through the medium of meshing gears 37, are connected with the shafts 26 so that on operation of the motor 15, the wings 28 will be oscillated for vertical swinging movement at opposite sides of the fuselage and operate simultaneously with the operation of the supplemental propeller 16. When the supplemental propeller 16 and the wings 28 are in operation, the aircraft will be able to make a quick take-off and also ascend and descend with safety, the take-off and landing of such aircraft being accomplished in a minimum area and thus in the take-off, a large ground run is avoided.

When the aircraft is in flight and trouble develops in the main motor 8, which requires the stopping thereof, or such motor becomes inoperative, then the auxiliary motor 15 can be started and the operation of the supplemental propeller 16 and the wings 28 will enable the aircraft to be brought to a landing with safety.

What is claimed is:—

In an aircraft, a fuselage, horizontally formed pintle sleeves on opposite sides of the fuselage at the top thereof, vertically movable flap wings, pintle eyes on said wings interfitting with the eyes on the fuselage, pintles engaged in the eyes and swingingly connecting the wings with the fuselage, cranks fixed to one end of each pintle, turning wheels carried by the fuselage, and links eccentrically pivoted to the turning wheels and pivoted to the cranks.

JAMES P. WILEY.